United States Patent [19]

Lisec

[11] Patent Number: 5,280,832
[45] Date of Patent: Jan. 25, 1994

[54] DEVICE FOR CONVEYING INSULATING GLASS PANES

[76] Inventor: Peter Lisec, Bahnhofstrasse 34, A-3363 Amstetten-Hausmening, Austria

[21] Appl. No.: 984,395

[22] Filed: Dec. 2, 1992

[30] Foreign Application Priority Data

Dec. 23, 1991 [AT] Austria .................... 2557/91

[51] Int. Cl.$^5$ ............................. B65G 15/14
[52] U.S. Cl. ..................... 198/626.5; 198/817; 198/836.3
[58] Field of Search ............ 198/626.1, 626.5, 817, 198/836.1, 836.3

[56] References Cited

U.S. PATENT DOCUMENTS

| | | |
|---|---|---|
| 2,218,913 | 10/1940 | Hughes et al. |
| 3,857,475 | 12/1974 | Smith ................... 198/626.5 |
| 4,139,921 | 2/1979 | Kline et al. |
| 4,422,541 | 12/1983 | Lisec |
| 4,493,167 | 1/1985 | Bovone ............ 198/626.5 X |
| 4,741,783 | 5/1988 | Daunheimer et al. |

FOREIGN PATENT DOCUMENTS

| | | |
|---|---|---|
| 384596 | 12/1987 | Austria |
| 4029669 | 7/1991 | Fed. Rep. of Germany |
| 2653682 | 5/1991 | France |

OTHER PUBLICATIONS

"Potato tuber separator", *Soviet Inventions Illustrated*, Section PQ, Week K10, Apr. 1983, p. 9.

*Primary Examiner*—D. Glenn Dayoan
*Attorney, Agent, or Firm*—Young & Thompson

[57] ABSTRACT

For transporting sealed insulating glass panes having glass plates (1,1') of different sizes, a conveying device is provided having hook-like carrying elements (23) with pressure jaws (4) and supports (3) for the smaller glass plate (1) and pressure jaws (25) and supports (26), attached to separate conveyor chains (14') and (27), for the larger glass plate (1') projecting beyond the smaller glass plate (1). The conveyor chain (27) with the supports (26) is adjustable with respect to its height so that the pressure jaws (4) and (25) engage, independently of the overhang of the larger glass plate (1'), in all cases in the zone of a spacer frame between the glass plates (1,1').

10 Claims, 3 Drawing Sheets

DEVICE FOR CONVEYING INSULATING GLASS PANES

FIELD OF THE INVENTION

The invention relates to a device for conveying insulating glass panes with different-size glass plates, somewhat inclined with respect to the vertical, the edge joint thereof being filled at least in part with a filling compound, with supports engaging the glass plates of the insulating glass panes in the zone of their outer edges of the bottom rims, and with a lateral prop means for the insulating glass panes.

BACKGROUND OF THE INVENTION

A device for conveying insulating glass panes has been known from Austrian Patent 384,596 or German Patent 3,038,425 and from German Patent 4,029,669. These conventional devices have proven themselves suitable for transporting insulating glass panes in the zone of sealing machines, particularly for the transport of insulating glass panes during and after sealing.

Besides insulating glass panes wherein the glass plates are of equal size so that the outer rims of the glass plates lie in joint planes which are perpendicular to the flat extension of the insulating glass pane, there are also insulating glass panes wherein the glass plates are of differing size. Thus, there are insulating glass panes wherein one of the glass plates protrudes at least along one rim of the insulating glass pane beyond the other glass plate. In this case, the spacer frame is arranged so that it follows substantially the contour of the smaller glass plate. Such insulating glass panes (also called "staggered elements") cannot be transported by means of the conventional devices. For this reason, such insulating glass panes have thus far been sealed manually while in a horizontal position because the transporting of insulating glass panes fashioned as staggered elements is impossible, or not easily possible, with the known vertical conveyors during and after the sealing step.

OBJECT OF THE INVENTION

The invention is based on the object of further developing the device discussed hereinabove in its known aspects in such a way that it is possible by means of this device to transport also staggered elements, particularly during (only a portion of the edge joint having been filled with sealing compound) and after the sealing step, without any problems.

SUMMARY OF THE INVENTION

This object has been attained according to this invention by providing that the supports on at least one side of the insulating glass pane are adjustable, independently of the supports on the other side of the insulating glass pane, in parallel to the plane of the insulating glass pane, i.e. substantially vertically.

By virtue of the structure in accordance with the invention, the conveying device can be adapted to the overhang of one glass plate with respect to the other glass plate, existing along at least one rim of an insulating glass pane, by the feature that the supports are adjusted to the distance of the rims. In case the supports are adjusted so that they are at the same level, then the device of this invention can also transport insulating glass panes wherein the rims of the glass plates located at the bottom during transportation lie in a plane perpendicular to the insulating glass pane.

The lateral propping of the insulating glass panes can be provided, as described in Austrian Patent 384,596 or DAS 3,038,425, by a prop means exhibiting supporting rollers freely rotatable about substantially vertical axes and mounted to a beam, the insulating glass pane being in contact with these supporting rollers only in the region of its top edge. However, propping of the insulating glass pane can also be accomplished by a field of supporting rollers or supporting cylinders, or alternatively with the aid of an air cushion ("air cushion wall"). All of the aforementioned possibilities of lateral propping of the insulating glass pane can be utilized without any problems since the insulating glass pane is guided with adequate accuracy by the conveying element designed in accordance with this invention, engaging in the zone of the bottom rim of the insulating glass pane.

BRIEF DESCRIPTION OF THE DRAWING

Additional details and features of the invention can be seen from the following description of examples of the invention with reference to the appended drawings wherein.

DETAILED DESCRIPTION OF THE INVENTION

Figure 1:
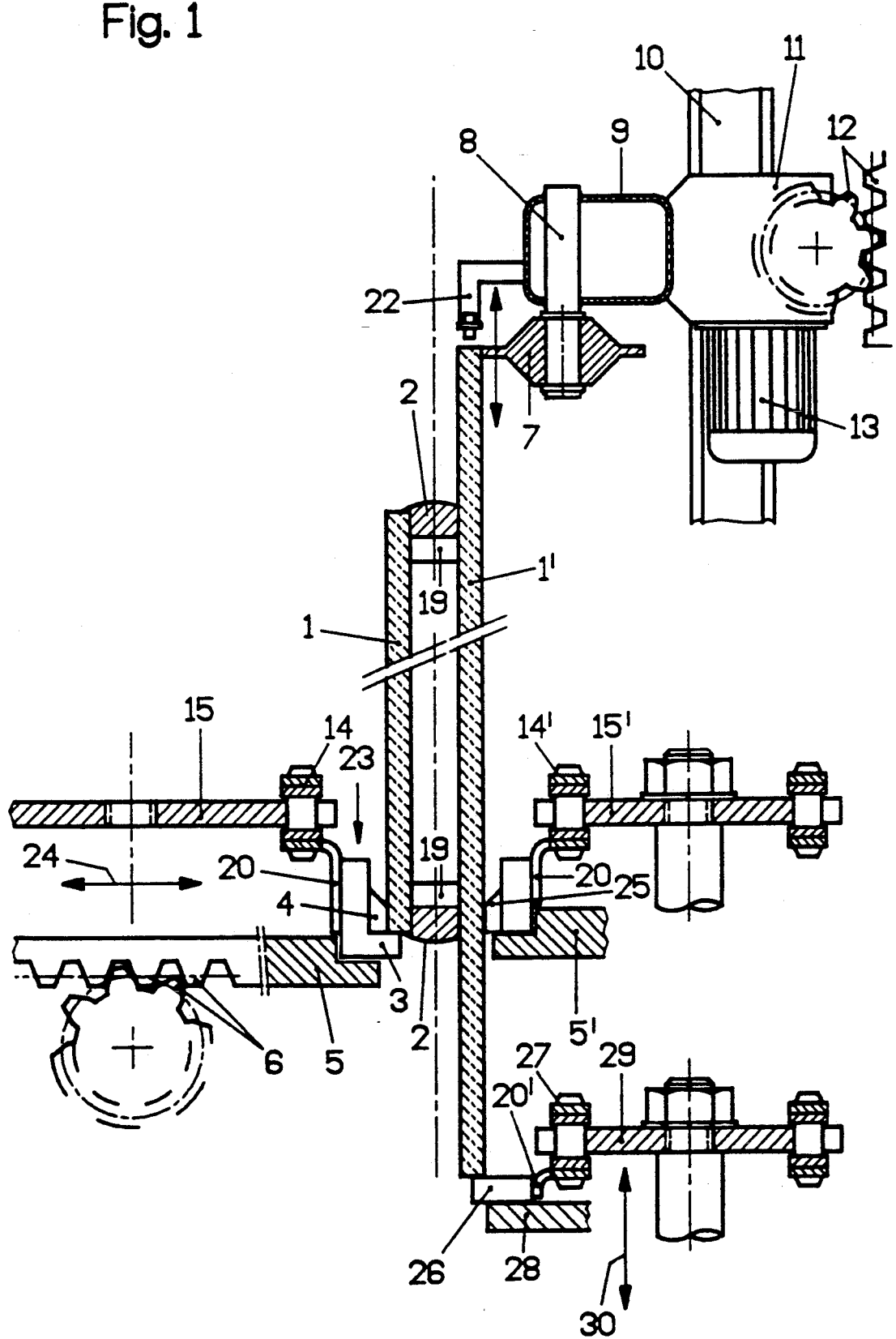
FIG. 1 shows, in a vertical sectional view, a first embodiment of the device according to this invention.

FIG. 1 illustrates an insulating glass pane consisting of two different-size glass plates 1, 1' with an interposed spacer frame 19; the edge joint of this pane is filled with a filling compound 2, wherein the filling compound 2, as shown in the drawing, can extend over the inner edges of the rims of the smaller glass plate 1.

The insulating glass pane is supported, at the bottom rim of its smaller glass plate 1 (receding with respect to the other glass plate 1'), by supports 3 exhibiting a substantially horizontal supporting surface.

As shown in FIG. 1, the supports 3 extend only partially over the bottom rim of the glass plate 1, namely only in the zone of the outer edge of the bottom rim of the glass plate.

In the embodiment illustrated in FIG. 1, the supports 3 are parts of substantially L-shaped carrying elements 23 which are provided with pressure jaws 4 on their vertical legs; these jaws contact the outer surface of the glass plate 1 in the region of the spacer frame 19.

The carrying elements 23 are attached by way of fishplates 20 to a conveyor chain 14, the latter traveling around drive and/or guide wheels 15 and being driven by the latter.

Additionally, a guide rail 5 is provided supporting the carrying elements 23, the carrying elements 23 sliding on this rail during their movement in the conveying direction (perpendicularly to the plane of the drawing).

The system of conveyor chain 14, drive or guide gear wheels 15 and guide rail 5 and thus also the carrying elements 23 is adjustable by means of a rack-and-pinion drive mechanism 6 (or a pneumatic cylinder drive unit or similar servo mechanism) in the direction of the double arrow 24 in order to adapt the supports 3 and the pressure jaws 4 to the position of the bottom rim of the glass plate 1; this is necessary when the device must be appropriately adjusted for transporting insulating glass panes having different spacer frame widths or glass thicknesses, i.e. differing external thicknesses.

The insulating glass pane is supported in the zone of the top rim of its glass plate 1' by supporting rollers 7 freely rotatable on a carrier 9 about substantially vertical axles 8. These supporting rollers 7, together with the conveying device engaging at the bottom rim of the insulating glass pane, define the conveying plane which is inclined with respect to the vertical by 5-6 degrees (not shown).

In order to be able to arrange the supporting rollers 7 in each case in the zone of the top rim of the glass plate 1', even with different-size insulating glass panes, the carrier 9 can be reciprocated by way of a guide shoe 11 on a frame 10 of the device. The shifting step can be performed by a drive motor 13 and a rack-and-pinion drive mechanism 12. A sensor 22 detects the top edge of the glass plate 1' with respect to its level and activates the drive motor 13; the latter brings the supporting rollers 7 into such a position that they are aligned with respect to the top rim of the glass plate 1' as illustrated in the drawing.

As mentioned above, it is also possible to employ a field of rollers, a row of supporting cylinders or an air cushion wall for the lateral propping of the insulating glass pane.

Pressure jaws 25 and supports 26, arranged independently of the former, are provided for the support and guidance of the larger glass plate 1' (protruding beyond the glass plate 1) in the zone of its bottom rim, on the one hand. The pressure jaws 25 are attached by way of fishplates 20 to a conveyor chain 14' extending in parallel to the endless conveyor chain 14; this conveyor chain 14' revolves about drive or guide gear wheels 15'. A guide rail 5' similar to guide rail 5 is provided for the guidance and support of the pressure jaws 25.

The supports 26, exhibiting an upper support area that is substantially horizontal but perpendicular to the conveying plane, are attached by way of fishplates 20' to a conveyor chain 27 oriented in parallel to the conveyor chain 14'. The drive or guide rear wheels 29 of the conveyor chain 27 can be mounted on the same axles or drive shafts as the guide or drive gear wheels 15' of the conveyor chain 14'. In this way, an exactly synchronous movement of the pressure jaws 25 and the supports 26 is made possible in a simple way.

FIG. 1 illustrates that the pressure jaws 25, just as the pressure jaws 4 of the carrying elements 23, contact the outside of the glass plate 1' approximately in the zone of the lower, horizontal leg of the spacer frame 19. The pressure jaws 25, in conjunction with the pressure jaws 4, effect the secure force-looking connection between the supporting and drive elements and the insulating glass pane so that the latter is transported also during the sealing operation securely and at constant speed. In this connection, the additional provision is made that the conveyor chains 14, 14' and 27 are moved in exact synchronism, for example by a joint drive unit. One example of such a synchronous drive system is illustrated and disclosed in Austrian Patent 384,596.

In order to adapt the height of the supports 26 to the overhang of the glass plate 1' with respect to the bottom rim of the glass plate 1, the conveyor chain 27 with its drive or guide gear wheels 29 and the guide rail 28 are movable in the direction of arrow 30 up and down, i.e. substantially in a direction in parallel to the plane of the insulating glass pane, which is also the conveying plane, so that the supports 26 can be set at the required height. Means (not shown) are provided for effecting this largely vertical adjustment, which means can be power means or manually actuated.

In the embodiment shown in FIG. 1, the arrangement is such that the carrying element, divided into a pressure jaw 25 and a support 26, is disposed on the side of the prop means for the insulating glass pane. However, it is also possible to fashion the carrying element on the prop side in the manner known from Austrian Patent 384,596 and to design the opposite carrying element as shown in FIG. 1 for the carrying elements on the prop side with separate pressure jaws 25 and supports 26, and to make this element displaceable in the direction of arrow 24 in order to be able to adapt the conveying device to differently thick insulating glass panes.

The pressure jaws 4 and the supports 3 need not be perforce arranged in each case at a carrying element 23. An embodiment is possible wherein pressure jaws 4 and supports 3 are attached alternatingly in side-by-side relationship to the conveyor chain 14.

The supports 26 need not be located exactly below a pressure jaw 25, although this version is preferred.

Although it is preferred that the pressure jaws 4 and 25, respectively, lie in exact opposition to each other, this is not a necessity.

Figure 2:
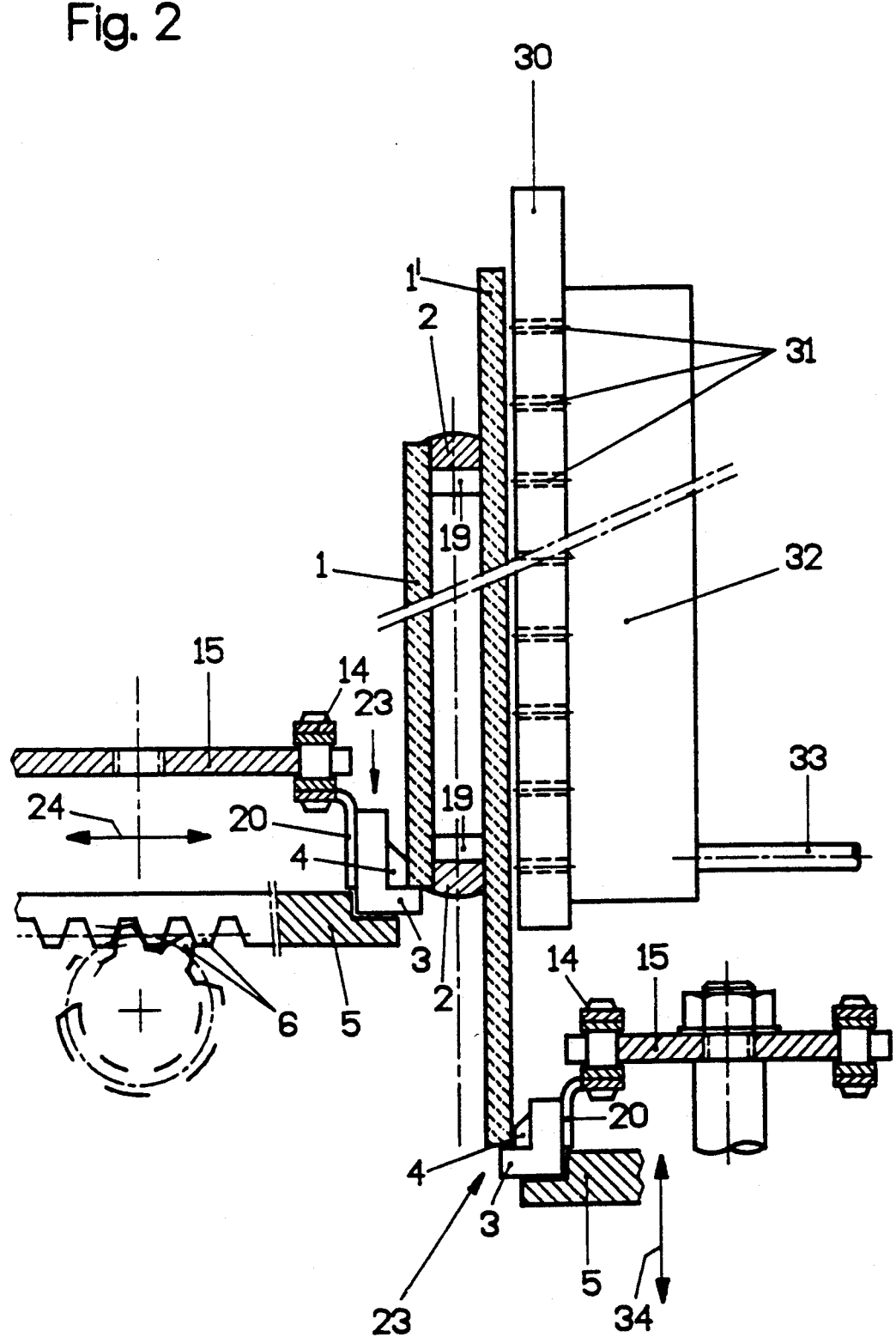
FIG. 2 is a schematic view of a second embodiment.

In the embodiment of a conveying device according to this invention illustrated in FIG. 2, the supports 3 are combined on both sides of the insulating glass pane with the carrying elements 23 bearing the pressure jaws 4, as is known per se from Austrian Patent 384,596.

In order to be able to adjust the supports 3 to the spacing of the rims of the glass plates 1 and 1' of the insulating glass pane, the system of guide rail 5, drive or guide gear wheels 15, conveyor chain 14, fishplates 20 and carrying elements 23 on the side of the larger glass plate 1' is adjustable, in the illustrated embodiment, in the vertical direction, i.e. in parallel to the conveying plane, which is also the plane of the insulating glass pane, in the direction of the double arrow 34. As in the case of FIG. 1, means (not shown) are provided for selectively effecting this adjustment.

An embodiment is also possible wherein the supporting elements 23 with the supports 3 and the associated components on the side of the smaller glass plate 1 of the insulating glass pane are adjustable in the vertical direction. This latter version has the advantage that no problems are encountered with the alignment of the conveying element (conveyor chains 14 with supporting elements 23 for the supports 3 and the pressure jaws 4 with the lateral prop means). The lateral propping is fashioned, in the embodiment of a device according to this invention shown in FIG. 2, as an air cushion wall. This air cushion wall comprises a panel 30' equipped with bores 31 which can be exposed to compressed air by way of a box 32 and a connection 33 so that an air cushion is formed between the glass plate 1' of the insulating glass pane facing the wall 30 and the wall 30 proper. It is understood that, in the embodiment illustrated in FIG. 2, the lateral prop means can be designed also as shown in FIGS. 1 and 3.

Figure 3:
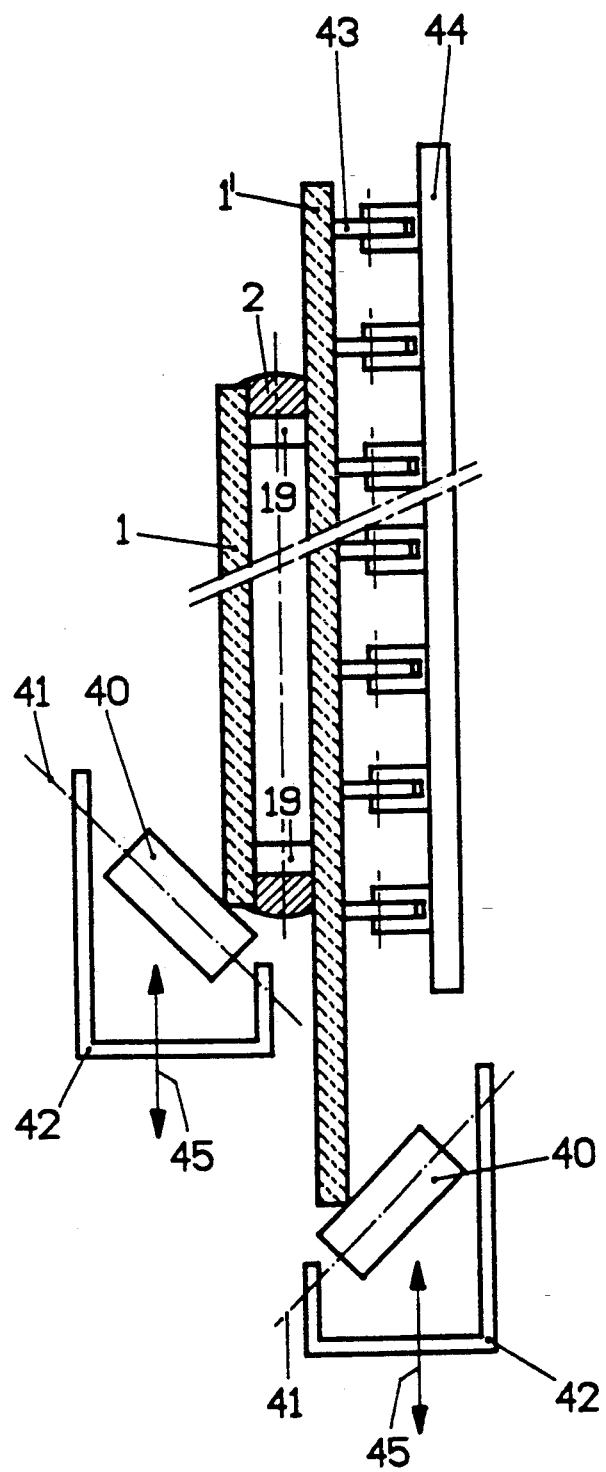
FIG. 3 is a schematic view of a third embodiment.

In the embodiment of a device according to this invention shown in FIG. 3, the supports engaging at the outer edges of the lower, horizontal rims of the glass plates 1 and 1' of the insulating glass pane are fashioned as two rows of obliquely oriented rollers 40. The axes 41 of the rollers 40 form preferably equal-size, acute angles with the conveying plane, which is also the plane of the insulating glass pane, and are preferably oriented so that their axes form with one another an angle of, for example, 90 degrees. However, other, for example obtuse, angles are possible between the axes 41 of the rollers 40 as well.

The rollers 40 are rotatably mounted in joint carriers 42 extending in parallel to the conveying direction and are preferably driven by way of drive means not shown in detail in order to effect transporting of the insulating glass pane.

In the embodiment shown in FIG. 3, a roller field with rollers 43 is provided for the lateral propping of the insulating glass pane; these rollers are mounted to a machine frame 44 to be freely rotatable about vertical axes.

It is understood that, in the embodiment shown in FIG. 3, the basic structure of which has been known from German Patent 4,029,669, it is also possible to arrange, as the lateral prop for the insulating glass panes, an air cushion wall according to FIG. 2 or a beam 9 with supporting rollers 7 in accordance with FIG. 1.

In order to be able to adapt the conveying device of the embodiment according to FIG. 3 to the vertical spacing between the lower horizontal rims of the glass plates 1 and 1' of the insulating glass pane, one or both of the carriers 42, preferably the carrier 42 located at a distance from the lateral prop means 43, 44, is adjustable together with its rollers 40 in the vertical direction (arrow 45). Again, as in the case of FIGS. 1 and 2, this adjustment is selectively effected by manual or powered means (not shown). In addition, this carrier 42, optionally also jointly with the carrier 42 of the rollers 40 on the prop means side, can be adjustable for adaptation to differently thick insulating glass panes, as known in principle from German Patent 4,029,669. However, the adjustment device can also be constructed as illustrated in FIG. 1 and as described hereinabove in connection with FIG. 1.

It should also be noted that, in the embodiment shown in FIG. 3, it is also possible to provide, in place of the rollers 40, endless conveyor belts as known per se from German Patent 4,029,669.

In accordance with a version not shown in detail, the supports 3 with the pressure jaws 4 at the holders 23 can be replaced, in the embodiment shown in FIG. 2, by obliquely oriented supports engaging, similarly as the rollers 40, merely at the outer edge of the lower rim of the insulating glass panes 1, 1'.

In summation, the invention can be represented, for example, as follows:

For transporting sealed insulating glass panes having glass plates 1, 1' of differing sizes, a conveying device is provided comprising hook-like carrying elements 23 with pressure jaws 4 and supports 3 for the smaller glass plate 1 and pressure jaws 25 and supports 26, attached to separate conveyor chains 14' and 27, for the larger glass plate 1' protruding beyond the smaller glass plate 1. The conveyor chain 27 with the supports 26 can be adjusted with respect to height so that the pressure jaws 4 and 25, independently of the overhang of the larger glass plate 1', engage in all cases in the region of a spacer frame between the glass plates 1, 1'.

What is claimed is:

1. In a device for conveying on edge insulating glass panes each comprised by two different-size glass plates (1, 1') having an edge joint therebetween filled at least in part with a filling compound (2), the device comprising supports (3, 26, 40) engaging lower edges of the glass plates (1, 1') of the insulating glass panes, and lateral prop means (7, 31, 43) for the insulating glass panes; the improvement wherein the supports (3, 26, 40) on at least one side of the insulating glass pane are adjustable independently of the supports (3, 26, 40) on the other side of the insulating glass pane in a substantially vertical direction parallel to the plane of the insulating glass pane and the supports (3, 26, 40) on one side of the glass pane are lower than the supports (3, 26, 40) on the opposite side of the glass pane.

2. Device according to claim 1, wherein the supports (3, 26) are arranged on endless conveying members (14, 27) moving in a conveying direction of the panes, and the supports (3, 26) on at least one side of the insulating glass pane are adjustably guided, independently of the supports (3, 26) on the other side of the insulating glass pane, in a machine frame of the device in a direction parallel to the plane of the insulating glass pane.

3. Device according to claim 1, wherein the supports are rollers (40), the axes of rotation (41) of which are inclined with respect to the plane of the insulating glass pane; the axes (41) of the rollers (40) arranged on both sides of the insulating glass pane lying in mutually intersecting planes; and the rollers (40) are supported in carriers (42), the spacing of the latter as measured parallel to the plane of the insulating glass panes being variable.

4. Device according to claim 1, wherein the supports (3, 26, 40) on both sides of the insulating glass pane are adjustable in parallel to the plane of the insulating glass pane independently of each other.

5. Device according to claim 1, wherein the spacing of the supports (3, 26, 40) as measured perpendicularly to the plane of the insulating glass pane is variable.

6. Device according to claim 1, wherein the supports (3, 26) move in the conveying direction of the glass panes and have substantially horizontally extending support surfaces, the support surfaces extending beneath the glass plates (1, 1') of the insulating glass pane from the outside, and having pressure jaws (4, 25) moving in the conveying direction having substantially perpendicularly extending pressure surfaces in contact with outer surfaces of the glass plates (1, 1') of the insulating glass pane, the pressure jaws (25) and the supports (26) on one side of the insulating glass pane being arranged on separate carriers (14, 27); and the spacing between these pressure jaws (25) and the supports (26), measured parallel to the plane of the insulating glass pane, being variable.

7. Device according to claim 6, wherein the supports (26) spaced from the pressure jaws (25) are provided on the side of the lateral prop means (7) for the insulating glass pane.

8. Device according to claim 6, wherein the pressure jaws (25) as well as the supports (26) are associated with guide rails (5, 28), the jaws and supports resting on these rails from above.

9. Device according to claim 6, wherein the pressure jaws (25) and the supports (26) are attached to endless conveying members (14, 27) which are spaced from each other and extend parallel to each other.

10. Device according to claim 1, further comprising pressure means pressing against the glass pane above said lower supports (3, 26, 40) and at the same level and in a direction opposite said supports (3, 26, 40) on said opposite side of the glass pane.

* * * * *